(12) United States Patent
Hosoya

(10) Patent No.: US 6,905,607 B2
(45) Date of Patent: Jun. 14, 2005

(54) METHOD FOR UTILIZING RAINWATER COLLECTED AT BUILDINGS

(75) Inventor: Makoto Hosoya, Kanagawa-ken (JP)

(73) Assignee: Takachiho Corp., Kanagawa (JP)

(*) Notice: Subject to any disclaimer, the term of this patent is extended or adjusted under 35 U.S.C. 154(b) by 0 days.

(21) Appl. No.: 10/673,520

(22) Filed: Sep. 30, 2003

(65) Prior Publication Data

US 2004/0108278 A1 Jun. 10, 2004

Related U.S. Application Data

(62) Division of application No. 09/842,378, filed on Apr. 25, 2001, now Pat. No. 6,663,769.

(30) Foreign Application Priority Data

Dec. 4, 2000 (JP) ................................ P2000-368256

(51) Int. Cl.⁷ .................................................. C02F 1/50
(52) U.S. Cl. ........................ 210/744; 210/759; 210/763; 210/764; 422/3; 422/29
(58) Field of Search ................................ 210/668, 721, 210/743, 744, 758, 759, 760, 763, 764; 422/3, 28, 29

(56) References Cited

U.S. PATENT DOCUMENTS

| | | | |
|---|---|---|---|
| 4,317,733 A | 3/1982 | Xhonneux | 210/752 |
| 4,549,969 A | 10/1985 | Gerlach et al. | 210/759 |
| 4,612,124 A | 9/1986 | Escrig | 210/721 |
| 4,683,065 A | 7/1987 | Sheikh | 210/668 |
| 5,096,596 A | 3/1992 | Hellenbrand et al. | 210/721 |
| 5,451,314 A | 9/1995 | Neuenschwander | 210/138 |
| 5,972,293 A * | 10/1999 | Kim et al. | 422/28 |
| 6,264,832 B1 * | 7/2001 | Panahi | 210/127 |
| 6,299,775 B1 | 10/2001 | Elston | 210/605 |
| 6,387,265 B1 | 5/2002 | Hosoya | 210/602 |
| 6,663,769 B2 * | 12/2003 | Hosoya | 210/104 |

FOREIGN PATENT DOCUMENTS

| | | |
|---|---|---|
| JP | 4-7082 | 1/1992 |
| JP | 3017741 | 8/1995 |
| JP | 9-88129 | 3/1997 |
| JP | 3049108 | 3/1998 |
| JP | 10317434 | 12/1998 |
| JP | 10317435 | 12/1998 |
| JP | 2000-500395 | 1/2000 |

OTHER PUBLICATIONS

English Language Abstract of JP 10–317435.
English Language Abstract of JP 3017741.
English Language Abstract of JP 4–7082.
English Language Abstract of WO 97/19025.
English Language Abstract of JP 3049108.
English Language Abstract of JP 9–88129.
English Language Abstract of JP 10–317434.

* cited by examiner

Primary Examiner—Peter A. Hruskoci
(74) Attorney, Agent, or Firm—Greenblum & Bernstein, P.L.C.

(57) ABSTRACT

A system for making use of rainwater falling on houses and buildings, which comprises a means for removing a predetermined quantity of initial precipitation from the rainwater collected form the roof surface of the building; and a purifier receiving the subsequent rainwater from which the initial precipitation has been removed. The purifier includes a filtering tank, a sterilization tank, and a supply tank connected to the sterilization tank. The filtering tank has a physical filter and a pH adjusting agent, the sterilization tank contains a primary reactive catalyst for producing active oxygen species, and the supply tank supplies aqueous hydrogen peroxide to the primary reactive catalyst. The system also has a storage tank that stores the purified rainwater supplied from the purifier. The storage tank contains a secondary reactive catalyst for decomposing and eliminating residual active oxygen species remaining in the purified rainwater supplied from the purifier.

16 Claims, 9 Drawing Sheets

METHOD FOR UTILIZING RAINWATER COLLECTED AT BUILDINGS

CROSS-REFERENCE TO RELATED APPLICATION

This application is a divisional of application Ser. No. 09/842,378, filed Apr. 25, 2001 now U.S. Pat. No. 6,663,769, the disclosure of which is incorporated by reference in its entirety.

BACKGROUND OF THE INVENTION

1. Field of the Invention

The present invention relates to a system and a method for making use of rainwater falling on and collected at houses and buildings.

2. Description of the Related Art

In general, the volume content or the filling ratio of water molecules in water is at most about 34%. To this end, water is compared to sponge having a number of air gaps in it. Since water molecules are chemical compounds consisting of oxygen and hydrogen, they attract both cations (positive ions) and anions (negative ions)) and trap various substances in the gaps among the water molecules.

Water is categorized as a solvent with a property of dissolving materials very well. On the other hand, most materials existing on the earth are categorized as solutes that are soluble in water. As commonly understood, "water", including the tap water, is a mixture of solvent (i.e., a gathering of water molecules) and solutes, such as minerals.

"Pure water" is artificial water, which is produced by physically filtering water, i.e., a mixture of water molecules and various solutes, and removing such solutes and impurities. Pure water has a high absorbency, which is an essential element of its function as a solvent. Pure water is called "hungry water" because of its absorbency, and is used to rinse IC substrates because of its cleansing ability. Pure water is also used as a raw material for drinking water and various beverages because it contains few impurities or solutes. Thus, pure water has been broadly applied to various uses in these years.

While pure water is an artificially filtrated product, rain and snow are products of the nature and closest to pure water because they are gatherings of pure water molecules evaporating in the atmosphere.

The quantity of solutes contained in a unit volume of water is expressed as hardness. The hardness of tap water in Japan is about 70 mg to 170 mg per liter, and is categorized as soft water containing few solutes by global standards. The hardness of tap water in mountainous areas of Europe is about 370 mg to 400 mg per liter, and is categorized as hard water. The hardness of rainwater is much lower even than soft water, at less than 20 mg per liter. This means that rainwater is supersoft water containing little solute and extremely close to the gathering just of water molecules that is, pure water.

The less solutes contained in water, the easier it is to filtrate or purify, and the more possible to treat without using harmful chlorine or other chemicals. Accordingly, rainwater can be recycled into safe natural water. Such recycled rainwater is superior in absorbency, and has a broad range of uses, including rinsing water or drinking water. As long as a reliable filtering means is used and the quality of rainwater is guaranteed, rainwater can be optimally used in various ways, including watering garden plants, washing cars, sanitary water, kitchen water and drinking water.

However, with the conventional techniques, rainwater has not been positively or practically utilized, in spite of its superior nature and possibility as the optimum living water. So far, rainwater has only been treated as wastewater, and recycling of rainwater has not been considered sufficiently.

SUMMARY OF THE INVENTION

Therefore, it is one of the objectives of the present invention to reevaluate the propertees of rainwater, and to provide a system and a method that can positively utilize rainwater collected at houses and buildings, making the best use of this natural resource.

To achieve the objective, rainwater is collected from the roof surface of a building or a house through a gutter. A predetermined amount of initial precipitation is removed or thrown away, and the subsequent rainwater is treated (e.g., purified) and stored in a storage tank. The purification includes pH adjustment and sterilization of the rainwater. The stored rainwater is then taken by, for example, pumping for actual use.

In another method of utilizing rainwater, rainwater is collected from the roof surface of a building or house through a gutter. A predetermined amount of initial precipitation is removed or thrown away, and the subsequent rainwater is supplied to a purifier, in which the rainwater is subjected to pH adjustment and sterilization. The purified rainwater is supplied to a storage tank. The water level of the storage tank is monitored, and if the water level reaches the prescribed upper limit, the rainwater is prevented from entering the purifier or the storage tank.

In still another method of utilizing rainwater, rainwater is collected from the roof surface of a building through a gutter. A predetermined amount of initial precipitation is removed or thrown away, and the subsequent rainwater is supplied to a purifier, in which the rainwater is subjected to pH adjustment and sterilization. The purified rainwater is then supplied to a storage tank. The water level of the storage tank is monitored, and if the water level reaches the prescribed lower limit, a predetermined amount of tap water is supplied to the storage tank in order to keep the water level at a certain level.

The second and third methods may be combined. In this case, those steps up to the supplying the purified rainwater in the storage tank are the same. Both the upper and the lower limits of water level of the storage tank are monitored. If the water level reaches the prescribed upper limit, no more rainwater is supplied to the purifier or the storage tank, and if the water level reaches the prescribed lower limit, a predetermined amount of tap water is supplied to the storage tank.

In any one of the above-described methods, rainwater is subjected to a prescribed physical filtration at or before the inlet port of the purifier. The purification step includes neutralization of acid rainwater by, for example, pH-adjustment, and sterilization using active oxygen species (or free radicals) produced by decomposition of aqueous hydrogen peroxide.

Preferably, the residual active oxygen species remaining in the purified rainwater is decomposed or eliminated in the storage tank using, for example, secondary reactive catalyst.

Preferably, before the purified rainwater is supplied from the storage tank for indoor use, an active charcoal filter and a sediment filter further filter the purified rainwater.

In another aspect of the invention, a system for utilizing rainwater falling on buildings and houses is provided. The system comprises a means for removing a predetermined amount of initial precipitation from rainwater collected from the roof of a building through a gutter, a purifier including a filter and a sterilizer, and a storage tank for storing the purified rainwater. The purifier receives rainwater, from which the initial precipitation has been removed. The filter of the purifier filters the rainwater physically, and adjusts the pH value of the filtered rainwater. The sterilizer sterilizes the filtered and pH-adjusted rainwater using active oxygen species (i.e., free radicals) produced by decomposition of aqueous hydrogen peroxide.

Another type of rainwater utilization system comprises an initial precipitation collection tank, a purifier including a filter and a sterilizer, a switching valve, a storage tank for storing purified rainwater, and a level sensor for sensing the water level of the storage tank. The initial precipitation collecting tank temporarily stores a predetermined amount of initial precipitation of the collecting from the roof of the building. The filter of the purifier carries out physical filtration and pH adjustment, and the sterilizer sterilizes the filtered and pH-adjusted rainwater using active oxygen species (i.e., free radicals). The switching valve switches the water path between the initial precipitation collection tank and the purifier. To be more precise, if the water level of the initial precipitation collection tank reaches a predetermined level, the switching valve closes up so that no more rainwater flows into the initial precipitation collection tank, and instead, that the subsequent rainwater flows into the purifier. The level sensor provided to detect the water level of the storage tank is connected to and cooperates with the switching valve. If the level sensor detects that the water level of the storage tank has reached the upper limit, it causes the switching valve to switch the water path and guide the rainwater into the initial precipitation collection tank.

Still another type of rainwater utilization system comprises an initial precipitation collection tank, a purifier, a storage tank storing purified rainwater, a tap-water supply pipe equipped with a tap-water supply valve, and a level sensor for sensing the water level of the storage tank. The initial precipitation collection tank temporarily stores a predetermined initial amount of rainwater collected from the roof of a building through a gutter. The purifier receives the subsequent rainwater after the initial precipitation has been removed into the initial precipitation collection tank. The filter of the purifier carries out physical filtration and pH adjustment, and the sterilizer sterilizes the filtered rainwater using active oxygen species (i.e., free radicals). The level sensor is connected to and cooperates with the tap-water supply valve. If the level sensor detects the water level of the storage tank having reached the prescribed lower limit, it causes the tap-water supply valve to open in order to supply a predetermined amount of tap water into the storage tank.

Still another type of rainwater utilization system is provided, which detects both the upper and the lower limits of the water level of the storage tank to adjust the water flow in the system. The system comprises an initial precipitation collection tank, a purifier including a filter and a sterilizer, and a storage tank for storing purified rainwater, as in the above-mentioned systems. This system also comprises a first valve for switching the water path between the initial precipitation collection tank and the purifier, and a second valve provided to a tap-water supply pipe extending from the storage tank. An upper limit level sensor is connected to the first valve, and a lower limit level sensor is connected to the second valve. If the upper limit level sensor detects that the water level of the storage tank has reached the prescribed upper limit, it causes the first valve to switch the water path from the purifier to the initial precipitation collection tank. Upon switching the water path, the rainwater collected from the roof flows into the initial precipitation collection tank, and no more rainwater flows into the purifier. If the lower limit level sensor detects that the water level of the storage tank has reached the prescribed lower limit, it causes the second valve to open in order to supply the tap water into the storage tank. By filling the storage tank, which is short of water, with the tap water, the water level of the storage tank is kept at a desired level.

In the above-described systems, the initial precipitation collection tank may have a timer and a drainage valve in order to drain the initial portion of rainfall away from the tank after a prescribed time period.

Preferably, the filter has a physical filtration screen for filtering the rainwater collected from the roof, and a pH-adjusting agent for adjusting the pH value of the rainwater for neutralization because the collected rainwater is generally acidic. The sterilizer contains aqueous hydrogen peroxide and a primary reactive catalyst in order to produce active oxygen species (i.e., free radicals) through decomposition of the hydrogen peroxide. The active oxygen species are used to sterilize the filtered rainwater.

The storage tank contains a secondary reactive catalyst that reacts with the active oxygen species (i.e., free radicals) remaining in the purified rainwater supplied from the purifier, and that decomposes or eliminates the residual active oxygen species. In the reaction, the secondary reactive catalyst decomposes organic substances, while producing oxygen.

Preferably, the storage tank consists of multiple interconnected units or barrels. The number of units is selected depending on how much purified water is required to be stored. The storage tank is placed in the basement or buried in the ground.

In the system that has both upper and lower limit level sensors, a back-up sensor is further furnished to the system. The back-up sensor is placed slightly higher than the upper limit level sensor, and is connected to both the switching valve (i.e., the first valve) and the tap-water supply valve (i.e., the second valve). If the upper limit level sensor is out of order, the back-up sensor detects the water level of the storage tank, and carries out the same operations as the upper limit level sensor Namely, the back-up sensor causes the switching valve to shut off the water path to the purifier, and allows the rainwater to flow into the initial precipitation collection tank.

The upper limit level sensor is also connected to the tap-water supply valve. When the tap water is supplied to the storage tank because of the shortage of the purified rainwater, the upper limit level sensor detects the elevating water level, and causes the tap-water supply valve to close when the water level reaches the upper limit. As was mentioned above, if the upper limit level sensor is out of order, the back-up sensor detects the elevating water level, and causes the tap-water supply valve to close. In this manner, the water level of the storage tank is kept in the desirable range.

The system has a pump for pumping the purified rainwater from the storage tank for various uses. Preferably, an activated charcoal filter and a sediment filter are provided at or after the outlet port of the storage so that the purified rainwater is further filtered before being used indoor.

BRIEF DESCRIPTION OF THE DRAWINGS

Other objectives and advantages will be apparent from the following detailed description of the invention in conjunction with the attached drawings, in which.

DETAILED DESCRIPTION OF THE PREFERED EMBODIMENTS

The preferred embodiments of the invention will now be described in detail with reference to the drawings.

Figure 1:
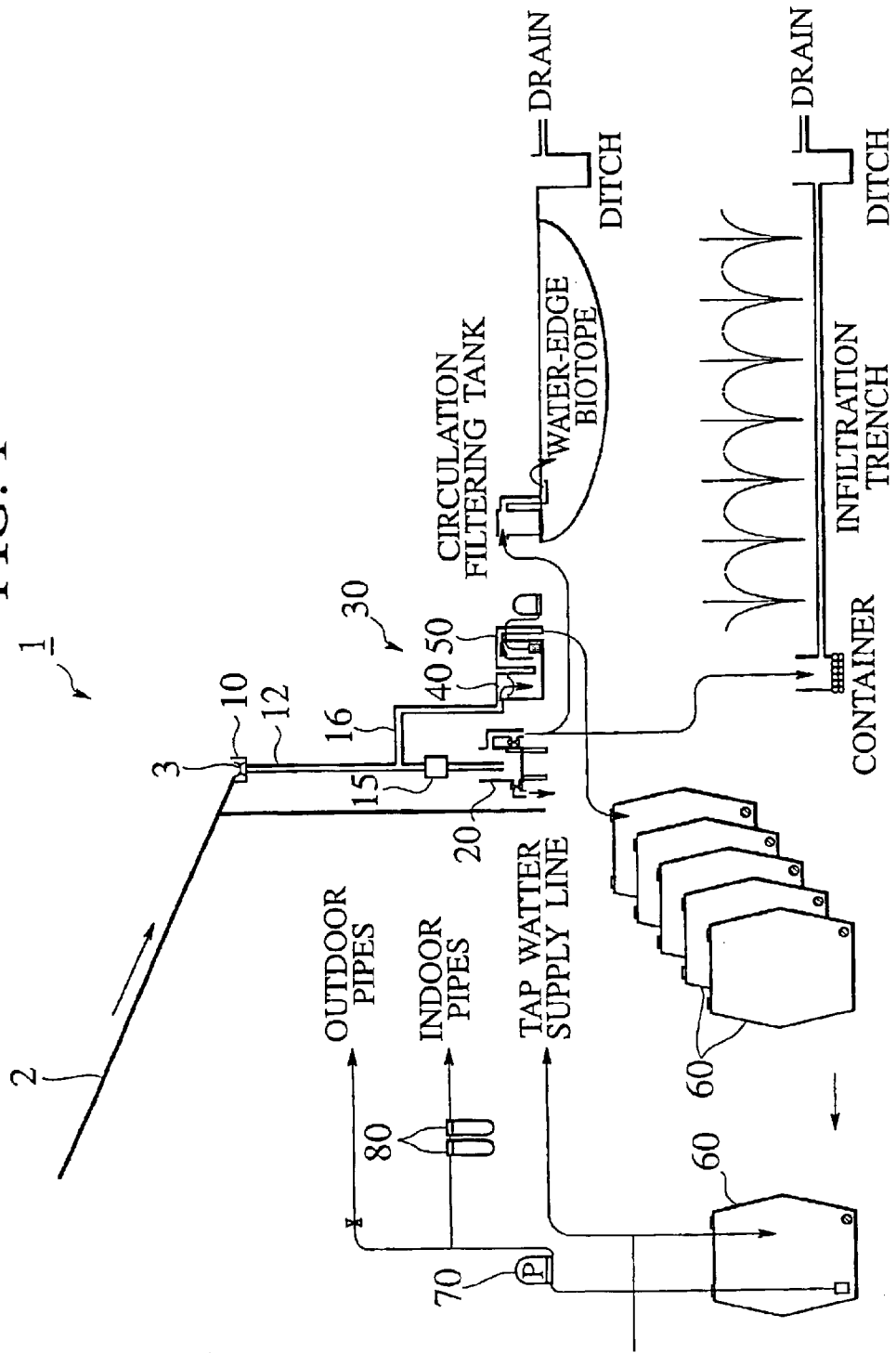
FIG. 1 schematically illustrates an example of rainwater utilization system according to the invention.

FIG. 1 illustrates the overall structure of rainwater utilization system 1 of the invention, which is applied to a residential building. The system treats the rainwater that has fallen on the building so that it rainwater becomes suitable for both outdoor and indoor use. Outdoor use includes watering garden plants, washing cars, and other incidental tasks. Indoor use includes bathroom, laundry, sanitary, and kitchen purposes.

The rainwater falling on roof 2 flows into gutter 3, and is collected in the container 10 placed under the eaves. A strainer 11 is furnished in the container 10. An initial pipe 12 extends from container 10 to initial precipitation collection tank 20, and is equipped with a switching valve 15. The initial precipitation collection tank 20 and the switching valve 15 are provided for purposes of separating a predetermined quantity of initial precipitation from the rainwater collected from the roof 2. In other words, the initial precipitation collection tank 20 is adapted to receive and temporarily store only the initial portion of rainfall via the switching valve 15, which is open in order to remove the initial precipitation.

Figure 2:
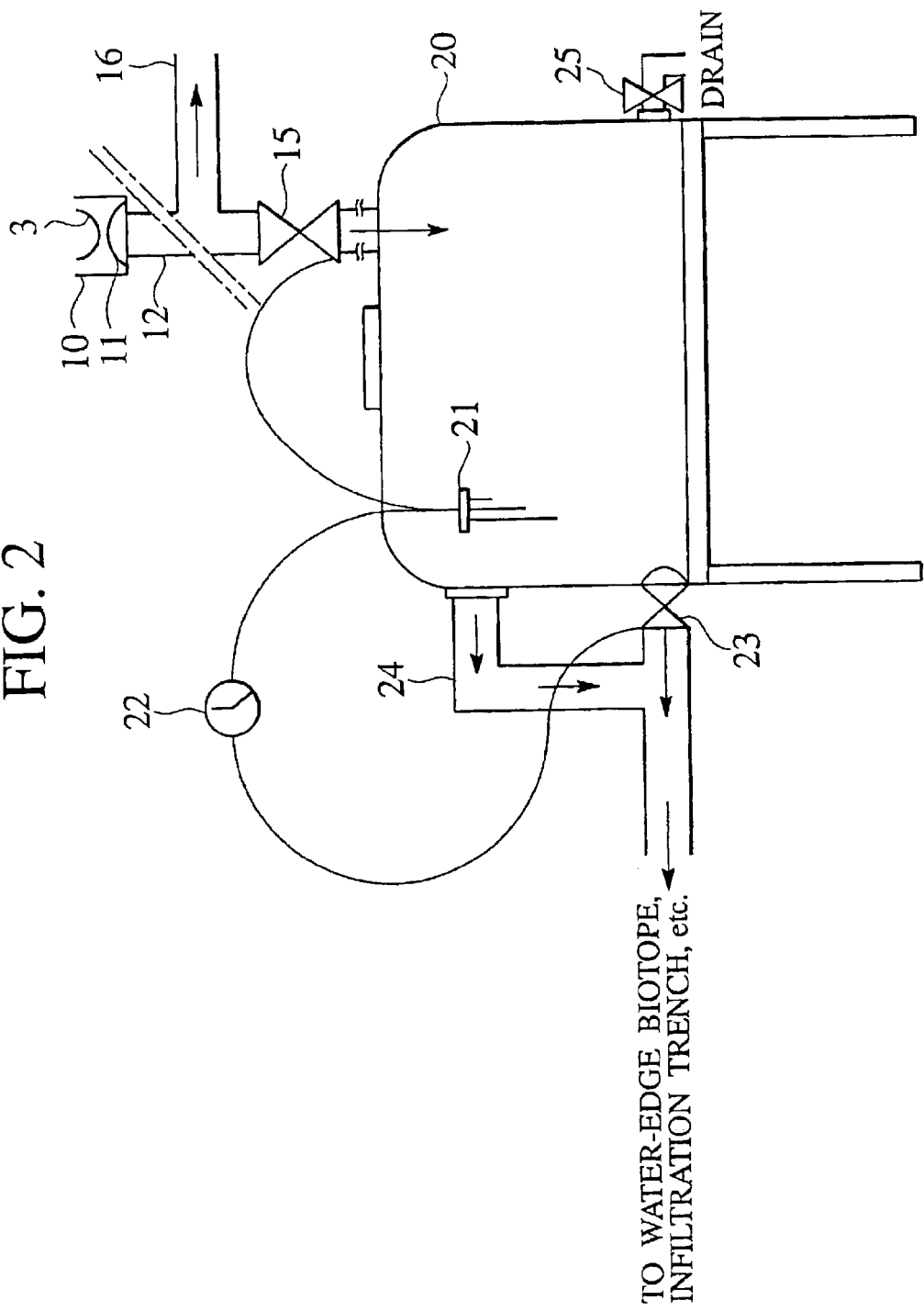
FIG. 2 schematically illustrates the water collecting container and the initial water tank used in the system shown in FIG. 1.

FIG. 2 illustrates a detailed view of the initial precipitation collection tank 20 and the switching valve 15. The initial precipitation collection tank 20 has a capacity of storing a predetermined quantity of rainwater, dependent on the roof surface area. The capacity can be, for example, 200 to 500 liters, or alternatively, the first 2 mm to 3 mm of precipitation depending on the area of the roof 2. The switching valve 15 is open when the initial portion of rainfall is guided into the initial precipitation collection tank 20 from the container 10. A level sensor 21 is furnished to the initial precipitation collection tank 20, and is connected to the switching valve 15. If the level sensor detects that the water level of the initial precipitation collection tank 20 has reached the prescribed level, it causes the switching valve 15 to close up and prevents the rainwater from flowing into the initial precipitation collection tank 20. Preferably, the switching valve 15 is controlled so that it automatically opens if a failure occurs to the system in order to guide the rainwater into the tank 20 and drain from the system without fail.

The initial precipitation collection tank 20 is furnished with a timer 22 and a drainage valve 23. The timer 22 is activated when the level sensor 21 detects that water level of the initial precipitation collection tank 20 has reached the predetermined level. After a preset time period (e.g., 10 hours to 120 hours), the drainage valve 23 opens to drain the initial precipitation from the initial precipitation collection tank 20 in preparation for the next rainfall. The initial precipitation collection tank 20 is also furnished with an overflow pipe 24 and a hand-powered valve 25 for manual drain.

Figure 3:
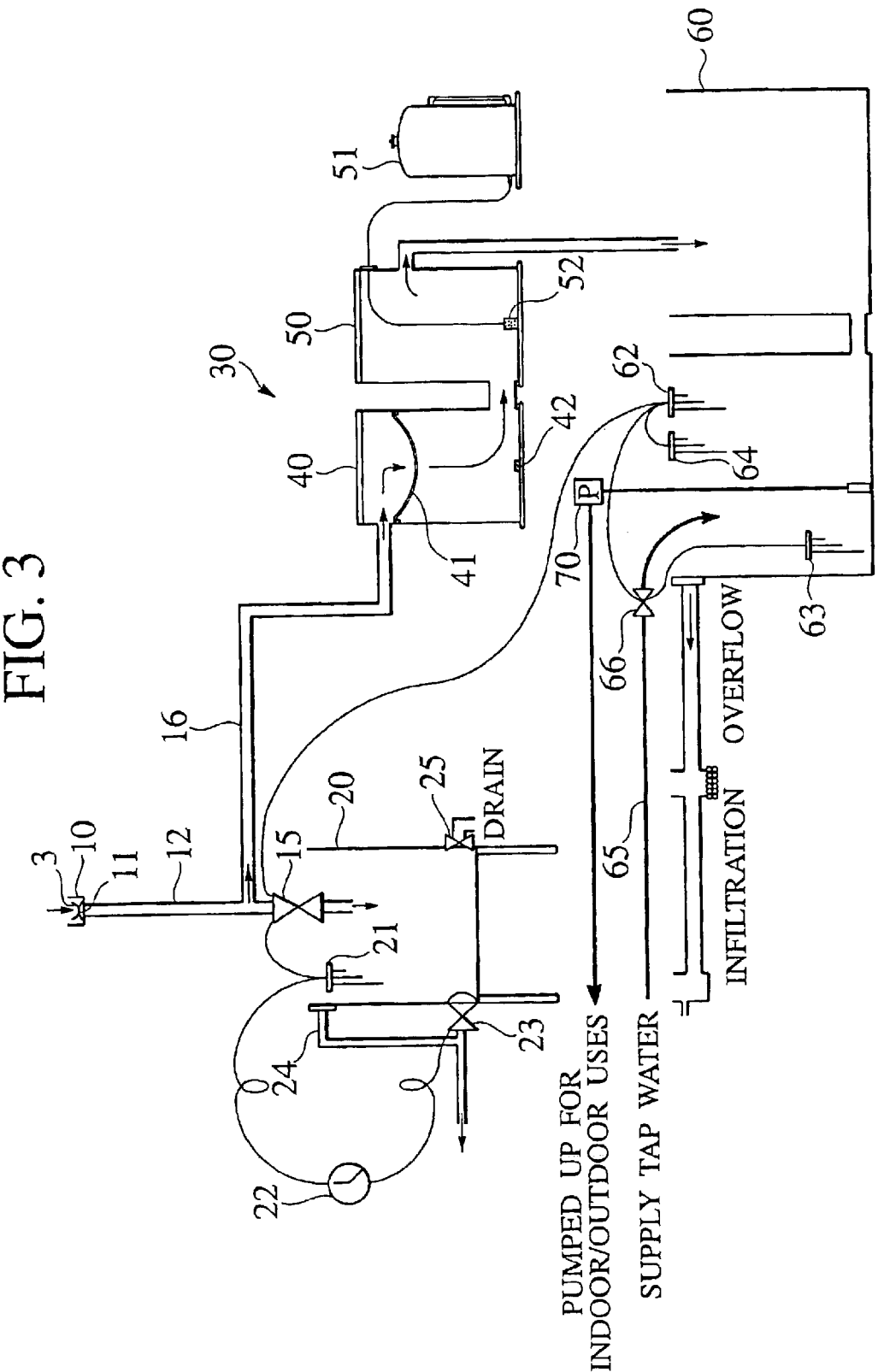
FIG. 3 schematically illustrates the essential portions of the system shown in FIG. 1.
Figure 4:
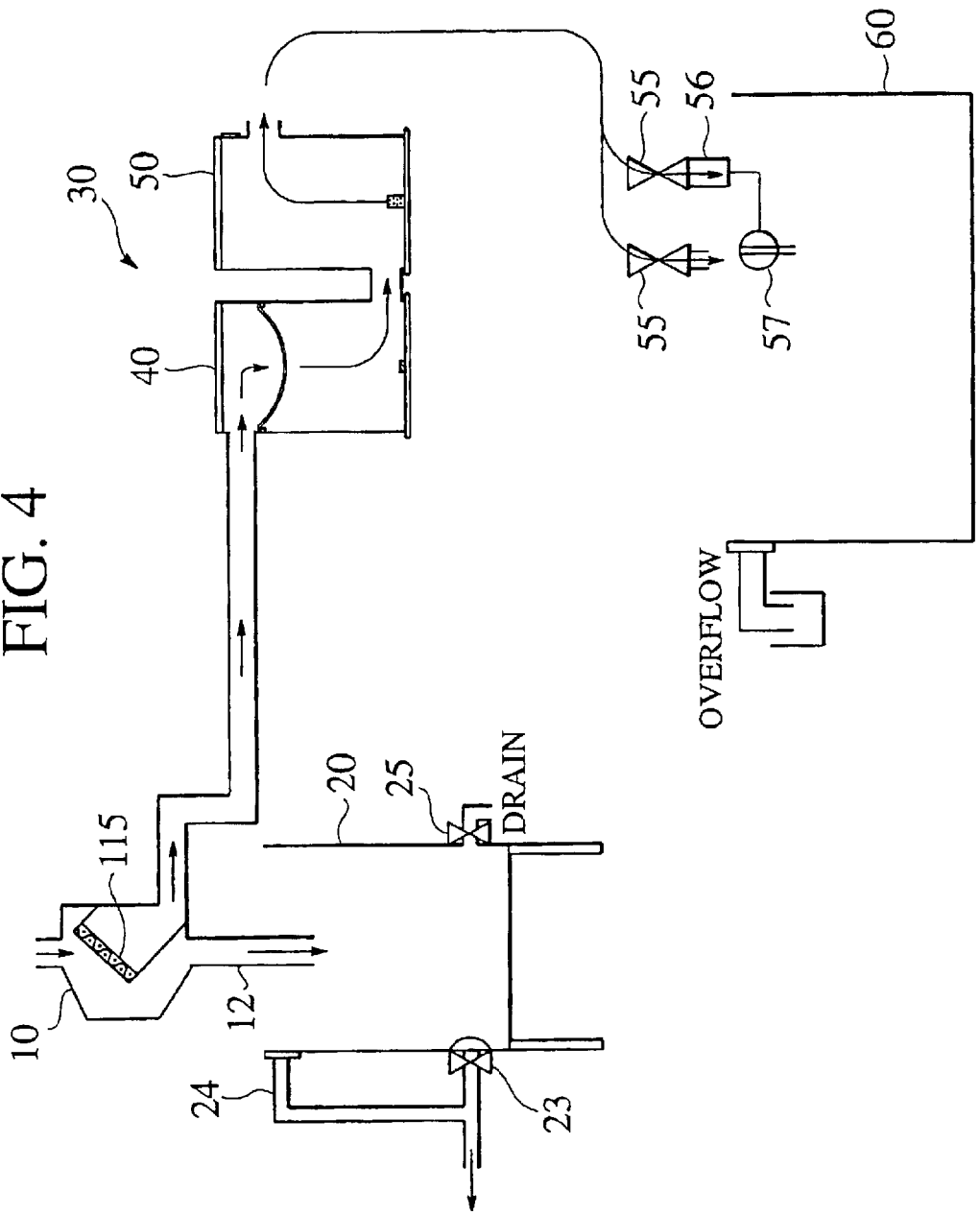
FIG. 4 illustrates another structure of the essential portions of the system shown in FIG. 1.

As illustrated in FIG. 1, the initial portion of rainwater temporarily stored in the initial precipitation collection tank 20 can be recycled into a biotope or infiltration trench in the garden or the backyard, FIGS. 3 and 4 illustrate how the rainwater is guided to purifier 30 and storage tank 60. In the example shown in FIG. 3, an inlet tube 16 is bypassed from the initial pipe 12, and leads to the purifier 30. When the switching valve 15 closes up, the subsequent rainwater collected in the container 10 is allowed to enter the purifier 30. The purifier 30 is a two-stage purification system, and comprises of a filtering tank 40 and a sterilization tank 50. The inlet port of the filtering tank 40 is positioned higher than the outlet port in order to guarantee one-way flow into the sterilization tank 50.

The example illustrated in FIG. 4 uses a strainer 115 in the initial container. The strainer 115 has a tilted surface with respect to the direction of the rainfall. The tilted surface of the strainer 115 is, for example, a metallic mesh. At the beginning of rainfall or if the rain slackens, the raindrops flow along the tilted surface of the strainer 115, and are collected in the initial precipitation collection tank 20. If the rain becomes heavier, the raindrops penetrate the strainer 115, and flow into the purifier 30. In this example, a manually operated valves 55 and an overflow outlet port are furnished between the purifier and the storage tank, so that if the water level of the storage tank reaches the upper limit, the valve 55 is closed manually, while excessive rainwater is drained. The valve 55 may be positioned before the purifier 30.

Figure 5:
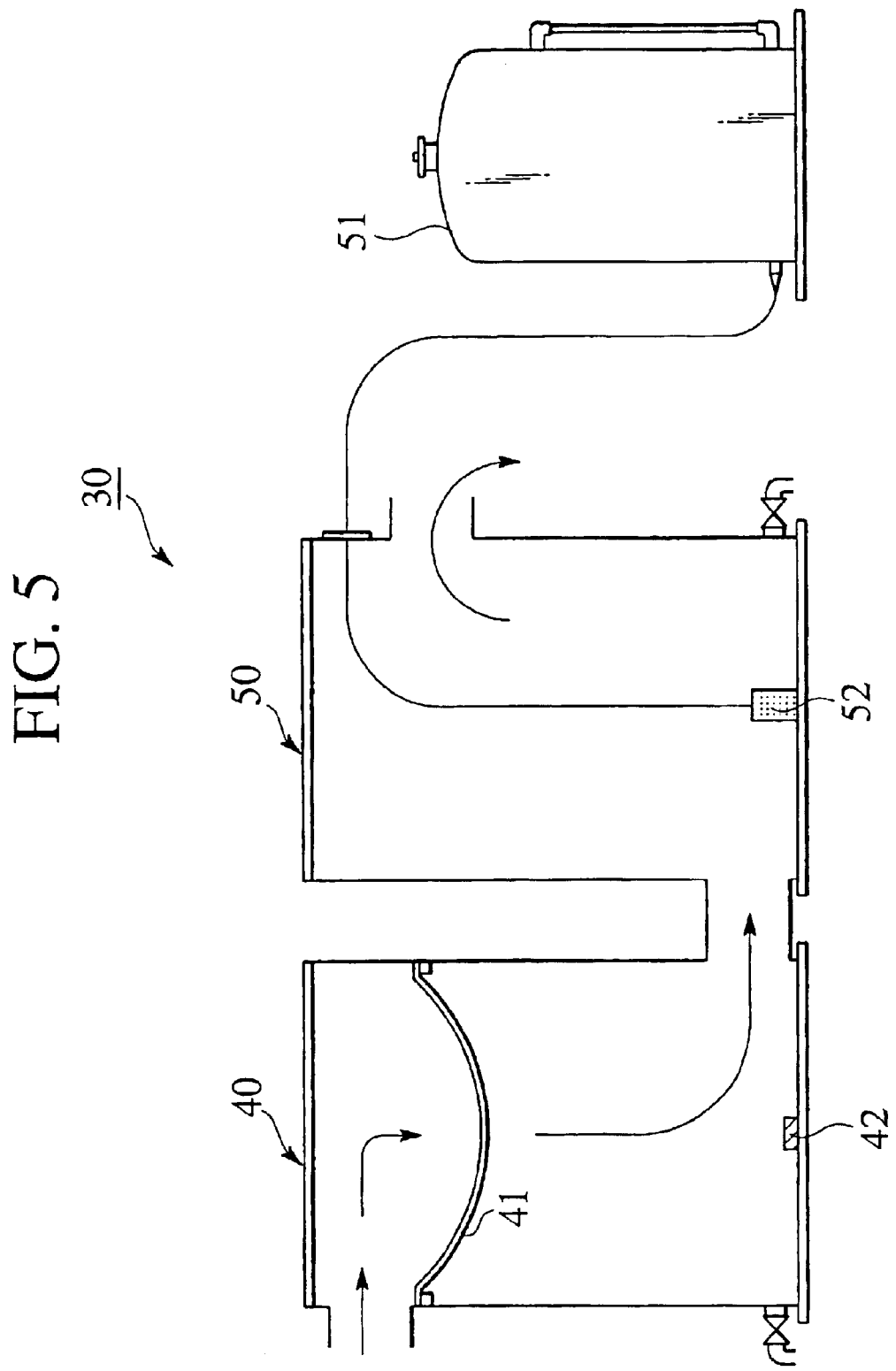
FIG. 5 schematically illustrates an example of the purifier of the system shown in FIG. 1.

FIG. 5 illustrates the detailed structure of the purifier 30. The filtering tank 40 is furnished with a metallic screen 41 having a number of holes with a diameter of, for example, 0.75 mm, and a pH-adjusting agent 42. The metallic screen 41 physically filters the rainwater supplied from the inlet pipe 16. The pH-adjusting agent 42 is placed on the bottom of the filtering tank 40 in order to neutralize the rainwater. Rainwater is generally acidic with a pH value of about 4.6. The pH-adjusting agent 42 is, for example, $CaCO_3$, which brings the pH value of the rainwater to about 6.

The sterilization tank 50 sterilizes the filtered rainwater using active oxygen species (or free radicals) produced by the decomposition of hydrogen peroxide ($H_2O_2$). Aqueous hydrogen peroxide is contained in a supply tank 51, which is connected to the sterilization tank 50. Solid catalyst grains are put into the supply tank 51, and start reacting with the hydrogen peroxide ($H_2O_2$) to produce pure oxygen ($O_2$). This oxygen generates pressure, and pushes the hydrogen peroxide ($H_2O_2$) out of the supply tank 51. The hydrogen peroxide is constantly supplied to the sterilization tank 50 via a tube coupled with a primary reactive catalyst 52 placed on the bottom of the sterilization tank 50. The hydrogen peroxide reacts with the primary reactive catalyst 52, and produces active oxygen species (or free radicals). During this reaction, oxygen is also produced because the active oxygen species turn into oxygen in a short time. The produced oxygen balances with the pressure from the supply tank 51. The primary reactive catalyst 52 is, for example, annealed $MnO_2$.

In this manner, hydrogen peroxide is constantly supplied from the supply tank 51 to the primary reactive catalyst 52 under a pressure balance between the oxygen produced in the supply tank 51 and the oxygen generated from the primary reactive catalyst 52. The reaction rate, and the quantities and percentages of the produced active oxygen species (e.g., hydroxyl radical (. $OH^-$), superoxide anion radical ($.O_2^-$), peroxide ($.O_2^{2-}$)) are determined by the quantitative ratio of the hydrogen peroxide supplied to the sterilization tank 50 to the primary reactive catalyst 52, the concentration of the aqueous hydrogen peroxide, the water temperature, and other factors.

Among the active oxygen species, peroxide($•O_2^{2-}$) has a high sterilization effect. The superoxide anion radical ($•O_2^-$) coagulates heavy metal ions, and the hydroxyl radical ($•OH^-$) decomposes organic substances. Although most of these active oxygen species turn into an oxygen molecule ($O_2$) in a short time, a certain quantity of active oxygen species remain in the rainwater.

Figure 6:
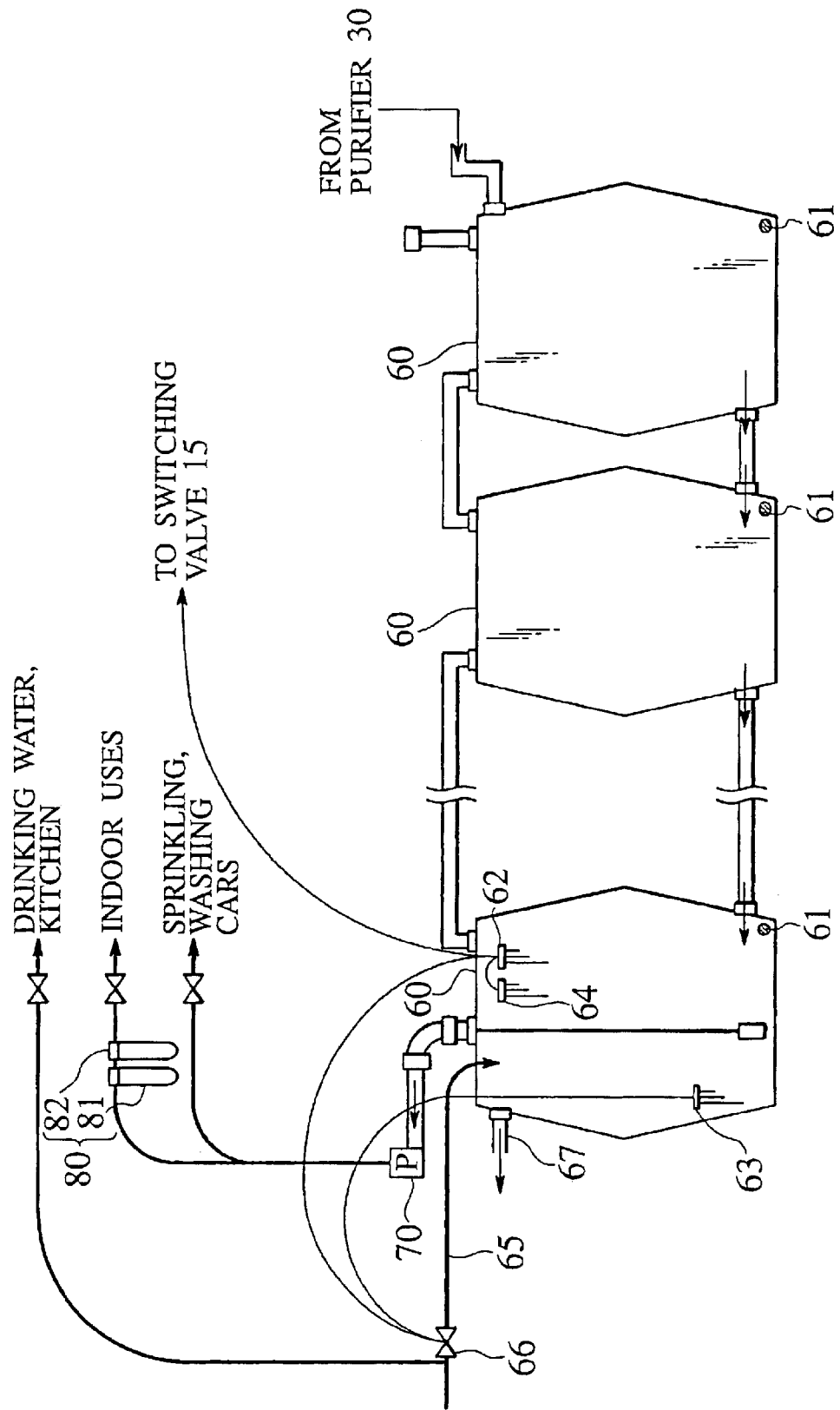
FIG. 6 illustrates an example of storage tanks used in the system shown in FIG. 1.

FIG. 6 illustrates the storage tank 60, which receives the purified rainwater from the purifier 30. The storage tank 60 may be consist of interconnected multiple units (e.g., barrels or tanks), depending on how much purified rainwater is to be stored. Preferably, the storage tank 60 is placed in a basement or buried under the ground. Each storage tank 60 contains a secondary reactive catalyst 61, which promotes the decomposition and elimination of the residual active oxygen species remaining in the purified rainwater. During the reaction between the secondary reactive catalyst 61 and the residual active oxygen species, oxygen is produced and organic substances are decomposed, and convection is caused in the storage tank 60. The convection occurs because of the decomposition of the residual active oxygen species by the secondary reactive catalyst 61, which allows the purified rainwater to be kept clean and pure in the storage tank 60 for a long time, without deterioration.

The last container of storage tank 60 is furnished with an upper limit level sensor 62 and a lower limit level sensor 63. A back-up sensor 64 is also provided adjacent to or slightly higher than the upper limit level sensor 62. The upper limit level sensor is connected to and cooperates with the switching valve 15. If the water level of the storage tank 60 has risen up to the prescribed upper limit, the upper limit level sensor 62 is activated, causing the switching valve 15 to open in order to allow the rainwater to flow into the initial precipitation collection tank 20. The lower limit level sensor 63 is connected to and cooperates with the tap-water supply valve 66. If the water level of the storage tank 60 has fallen to the lower limit (which means that the quantity of rainwater stored in the storage tank has become the minimum acceptable amount), the lower limit level sensor 63 is activated, and the tap-water supply valve 66 is opened. Consequently, a required quantity of tap water is supplied into the storage tank 60.

The upper limit level sensor 62 is also connected to the tap-water supply valve 66. If the upper limit level sensor 62 detects that the water level has risen to the upper limit due to the supplemental tap water, it causes the tap-water supply valve 66 to close up so as not to supply the tap water into the storage tank any more.

The back-up sensor 64 is used if the upper limit level sensor 62 is out of order. The back-up sensor 64 guarantees the operations of the system and prevents undesirable accidents. If the upper limit level sensor 62 can not detect the water level of the storage tank for some reasons, the back-up sensor 63 in turn detects the water level as having reached the upper limit. Then, the back-up sensor 63 causes the switching valve 15 to open, or the tap-water supply valve 66 to close.

Preferably, an overflow port 67 is provided to the upper portion of the storage tank 60 to drain the excessive rainwater out of the storage tank 60.

In the preferred embodiment of the system 1, a pump 70 is provided to pump the purified rainwater from the storage tank 60 for indoor use. Preferably, a filter 80, which consists of an activated carbon filter 81 and sediment filter 82, is provided after the pump 70. The activated carbon filter 81 is, for example, a commercially available 20-inch filter for removing positive ions and the like. The sediment filter 82 is, for example, a 5 μm filter for removing solutes other than ions.

Although, in FIG. 6, indoor use is exemplified as sanitary use, the purified and charcoal-filtered rainwater, which is purer and safer than the tap water, may be used for drinking, cooking, and other kitchen use.

Figure 7:
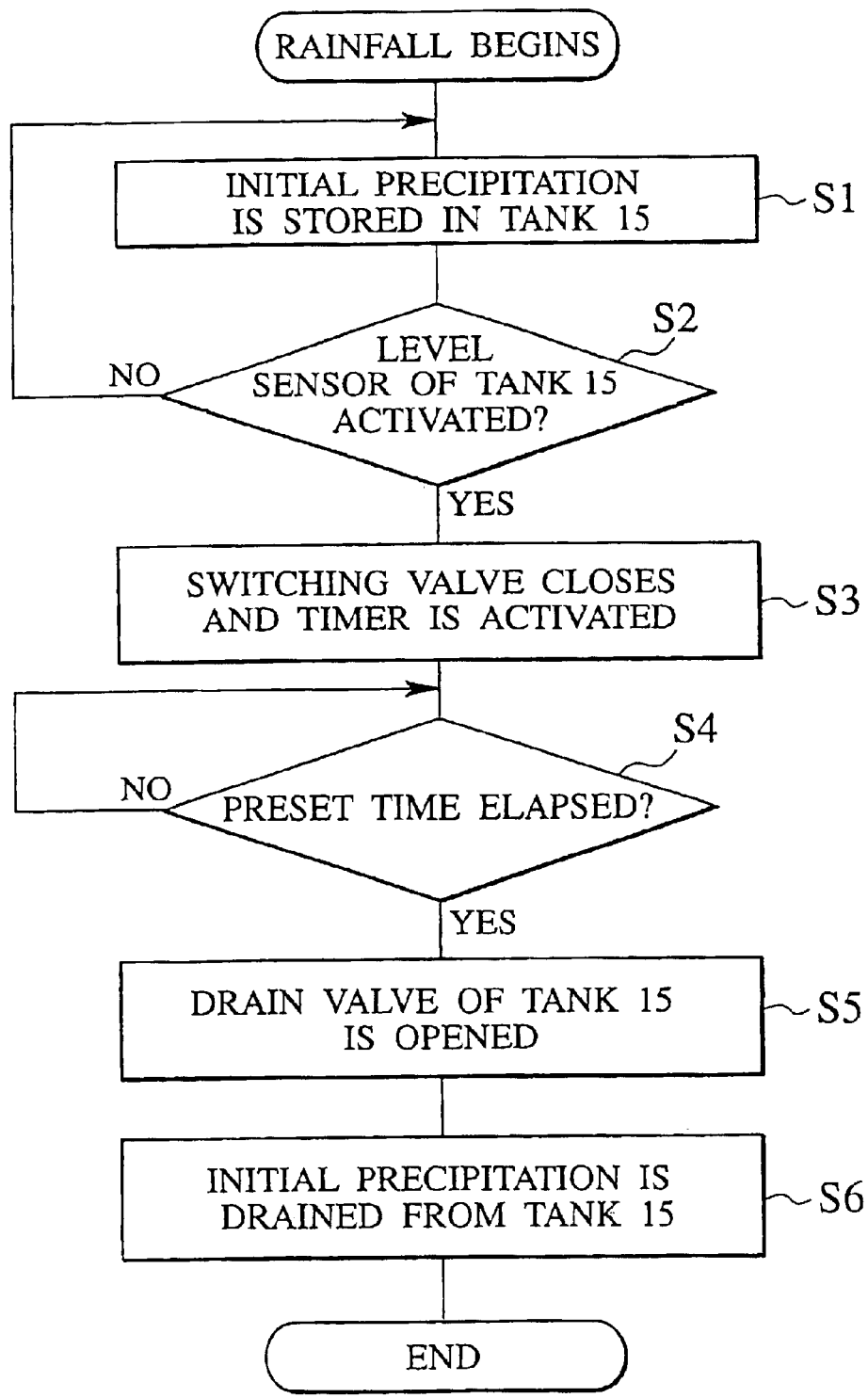
FIG. 7 illustrates an operation flow for removing a predetermined amount of initial precipitation.
Figure 8:
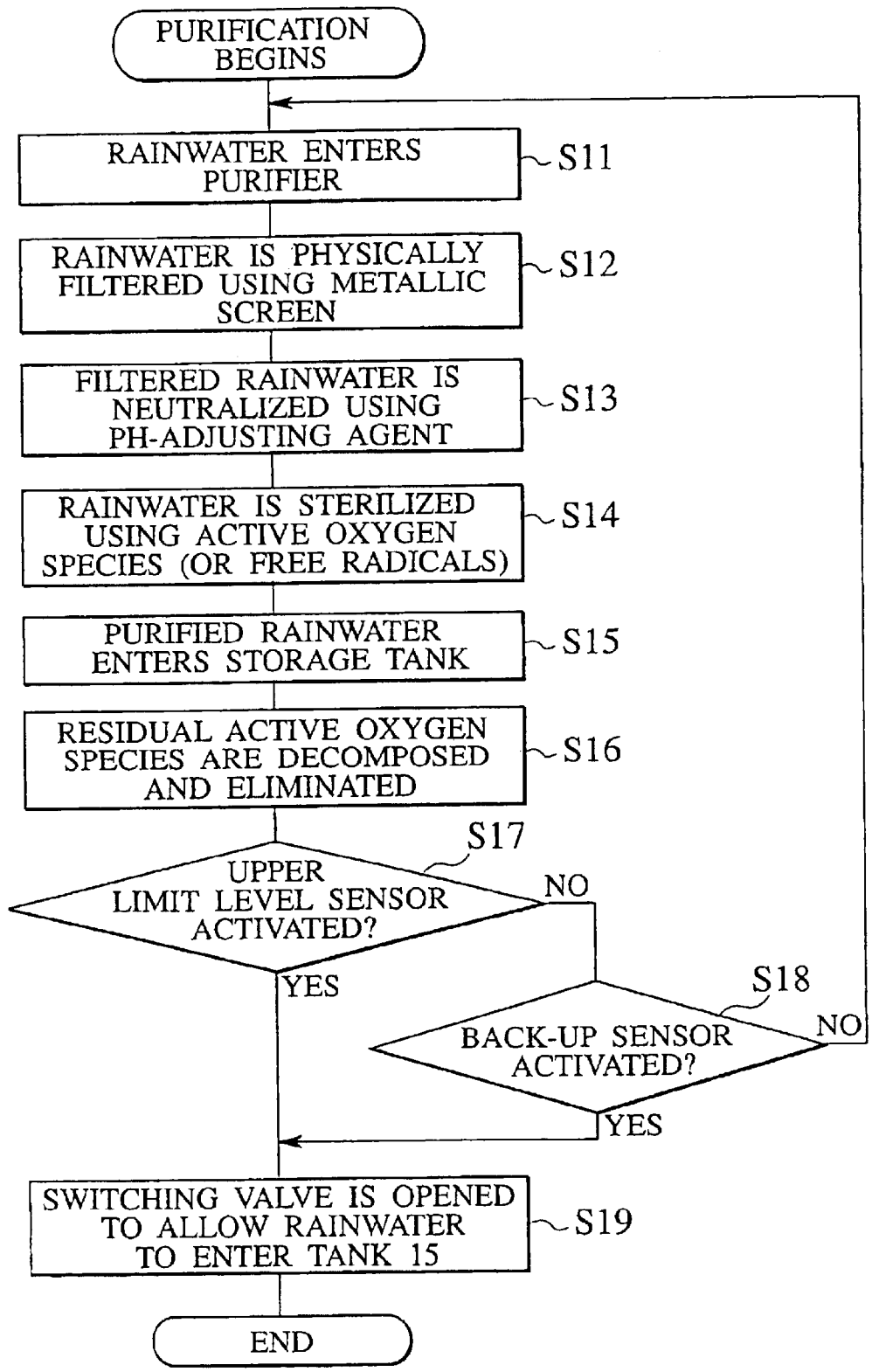
FIG. 8 illustrates an operation flow of purification of rainwater.
Figure 9:
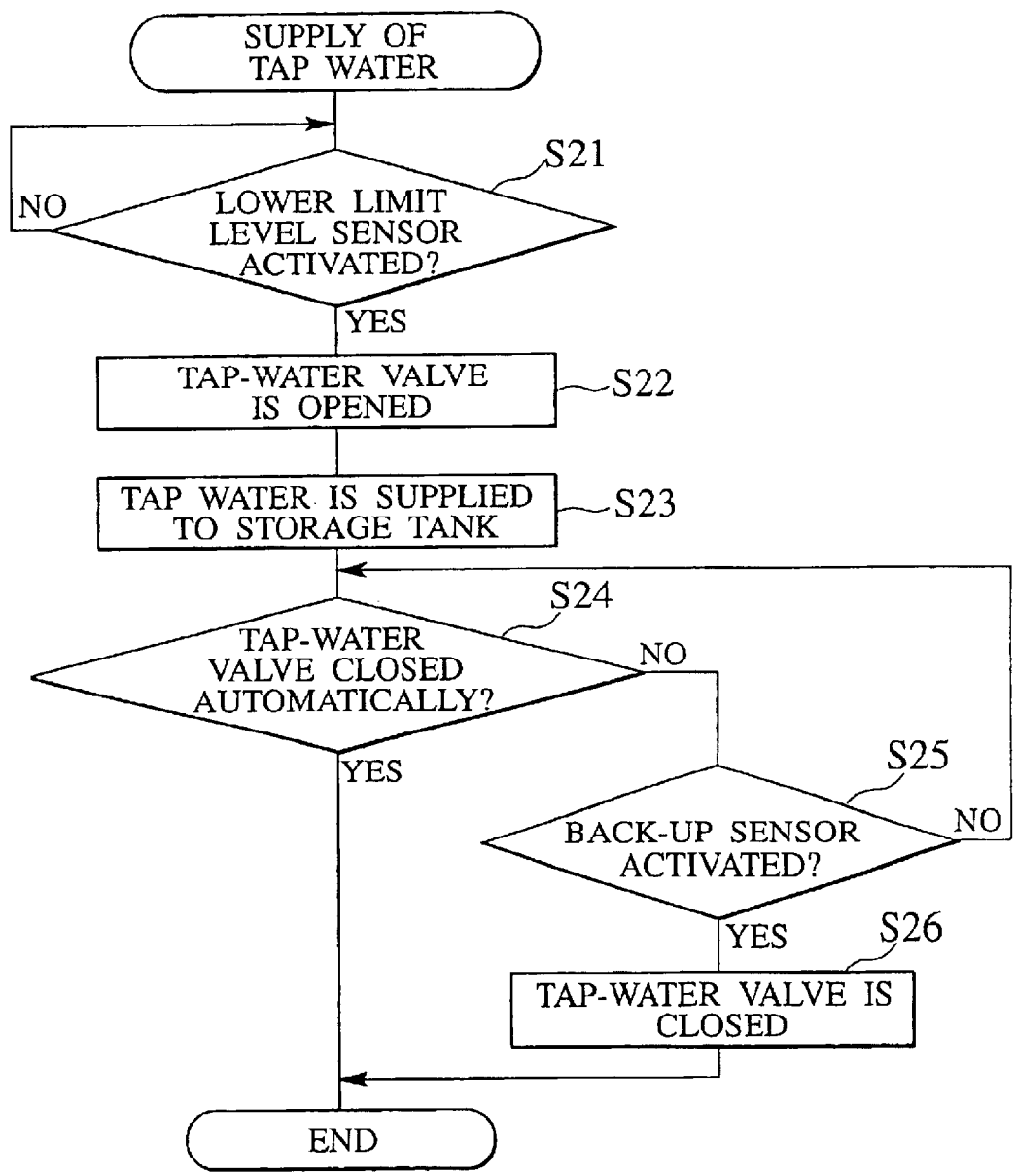
FIG. 9 illustrates an operation flow of supplying purified water from the storage tank.

FIGS. 7 through 9 illustrate the operational flows of the rainwater utilization system shown in FIGS. 1 through 6.

When rainfall begins, the rainwater flows along the roof surface 2 and the gutter 3, and is collected in the container 10 placed under the eaves. The rainwater further flown through the initial pipe 12 and is collected in the initial precipitation collection tank 20 through the switching valve 15 that is in the open state (step S1).

In step S2, it is determined whether the level sensor furnished to the initial precipitation collection tank 20 has been activated. If the water level of the initial precipitation collection tank 20 reaches the predetermined level that corresponds to a specified quantity of rainwater, for example, precipitation of 2 to 3 mm, the level sensor 21 is activated.

Then, a signal is supplied to the switching valve 15, causing it to close up so as to allow the rainwater to flow into the purifier. At the same time, the timer 22 is activated (step S3).

When a predetermined time period has elapsed (YES in step S4), the drainage valve 23 of the initial precipitation collection tank 20 is opened (step S5), and the temporarily stored initial rainwater is drained out of the tank 20 (step S6).

FIG. 8 illustrates the operational flow of the purification and storage of rainwater, which continues from step S3 of FIG. 7. Upon closing the switching valve 15, the rainwater collected in the container 10 is allowed to flow into the purifier 30 (step S11).

The rainwater supplied to the purifier 30 is physically filtrated by the metallic screen 41 (step S12). Then, the filtered rainwater is neutralized by a pH adjusting agent 42 placed on the bottom of the filtering tank (step S13).

The pH-adjusted rainwater is then supplied to the sterilizing tank 50 of the purifier 30, in which sterilization is carried out using active oxygen species produced by the decomposition of aqueous hydrogen peroxide ($H_2O_2$) (step S14).

The sterilized rainwater is supplied to the storage tank 60 (step S15), in which the residual active oxygen species remaining in the sterilized rainwater are decomposed and eliminated using secondary reactive catalyst 61 (step S16).

The reaction between the secondary active catalyst 61 and the residual active oxygen species produce oxygen, while decomposing the organic substances contained in the rainwater. For this reason, the rainwater stored in the storage tank 60 does not deteriorate for a long time, and can be maintained clean and pure.

In step S17, it is determined whether the water level of the storage tank 60 has reached the prescribed upper limit. If the water level has risen to the upper limit, the upper limit level sensor 62 is activated (YES in step S17).

The activation of the upper limit level sensor 62 causes the switching valve 15 to open in order to allow the rainwater to flow into the initial precipitation collection tank 20.

If the upper limit level sensor was not activated for some reasons (NO in step S17), in spite of the increase in water level, it is then determined whether the back-up sensor 64 has been activated (step S18). If the back-up sensor 64 has been activated (YES in step S18), the switching valve 15, which is connected to the back-up sensor 64, is opened to allow the rainwater collected in the container 10 to pass into the initial precipitation collection tank 20 (step S19). In this manner, even if the upper limit level sensor 62 does not work for some reason, the back-up sensor 64 carries out the required operations in place of the upper limit level sensor 62, thereby guaranteeing the operations of the system 1.

As illustrated in FIG. 1, the rainwater flowing into the initial precipitation collection tank 20 can be recycled as irrigation for biotope or green field.

FIG. 9 illustrates the operational flow of supplying the tap water into the storage tank 60 in times of a shortage of stored rainwater. As the purified rainwater is being used for various purposes, the quantity of the stored rainwater decreases, and the water level of the last container of storage tank 60 may reach the lower limit (i.e., the minimum level), especially in a dry season. The system 1 of the present invention detects a shortage of the purified rainwater, and supplies the tap water in order to maintain the water level of the storage tank 20 at a desirable level.

First, it is determined whether the lower limit level sensor 63 has been activated (step S21). If the water level of the storage tank 60 has reached the lower limit, the lower limit level sensor 63 is turned on (YES in step S21). The activation of the lower limit level sensor 63 causes the tap-water supply valve 66, which is connected to and cooperates with the lower limit level sensor 63, to open (step S22). Then, a required quantity of tap water is supplied to the storage tank 60 (step S23).

If, due to the supply of the tap water, the water level of the storage tank 60 returns to the upper limit, the upper limit level sensor 62 detects the water level as having reached the upper level, and causes the tap-water supply valve 66 to close. This automatic closing of the tap-water supply valve 66 is monitored (step S24). If the tap-water supply valve 66 was not closed for some reason (NO in step S24), which means that the upper limit level sensor 62 did not work, the process proceeds to step S25, in which it is determined whether the back-up sensor 64 is activated. If the back-up sensor 64 has been activated (YES in step S25), the tap-water supply valve 66 is shut to prevent the tap water from entering the storage tank any more (step S26).

Although not illustrated in the drawings, either a control board or a computer program can control these operations.

The purified rainwater stored in the storage tank 60 is pumped up for various uses. Although the purified rainwater can be used as it is because of its purity and cleanliness, it may be filtered further before it is used for kitchen purposes. For example, an activated carbon filter 81 can be used to remove positive ions and the like, and a sediment filter 82 can be used to remove solutes other than ions. The activated carbon filter and the sediment filter can be used in combination.

The rainwater utilization system has various applications in a wide range of scales. Such applications include, but not limited to:

(1) supplying household water for washing cars, sprinkling, watering garden plants (small scale);
(2) supplying sanitary water used in bath rooms and for laundry (small or medium scale);
(3) supplying water to a pond or biotope (in a small scale);
(4) using rainwater as coolant in an air conditioning system or a heat exchanger (medium or large scale);
(5) supplying living water used in a daily life for laundry, bathroom, and cleaning (medium scale);
(6) supplying kitchen water for drinking, cooking, dish washer, etc. (medium scale);
(7) recycling rainwater in a hot-water system or a solar heater system (medium scale);
(8) recycling rainwater for sprinkling kitchen gardens and green house (wide range of scales);
(9) watering potted plants or house plants (small or medium scale);
(10) storing purified rainwater as emergency water life line as a precaution for natural calamities (medium or large scale);
(11) using rainwater for fire fighting (large scale);
(12) as a measure against water shortage (e.g., an infiltration trench for garden trees and plants, permeable water for preventing the lowering of groundwater levels, etc. wide-ranging scales); and
(13) as a measure against flood (including infiltration trenches and reservoirs for urban systems) (medium or large scale).

In the above applications, the rainwater drained from the initial precipitation collection tank or overflowing the storage tank is recycled for outdoor uses. On the other hand, the purified rainwater through pH adjustment and sterilization is suitable for indoor uses. In this manner, the invention can make best use of natural resources, positively utilizing rainwater.

Although the invention has been described based on the preferred embodiments, the invention is not limited to these examples and many changes and substitutions are possible without departing from the scope of the invention, which is defined by the appended claims.

What is claimed is:

1. A method for utilizing rainwater falling on a building, the method comprising:

removing a predetermined quantity of initial precipitation from the rainwater collected from a roof surface of the building;

supplying the rainwater to a purifier comprising a filtering tank containing a pH adjusting agent and a sterilization tank containing a primary reactive catalyst for producing active oxygen species, wherein the purifier carries out pH adjustment and sterilization;

supplying the rainwater from the purifier to a storage tank; and pumping out the rainwater from the storage tank for various uses.

2. The method of claim 1, further comprising carrying out physical filtration at or before an inlet port of the purifier.

3. The method of claim 1, wherein the pH adjustment neutralizes the rainwater that is acidic, and the sterilization is carried out using active oxygen species produced by decomposition of aqueous hydrogen peroxide.

4. The method of claim 1, further comprising decomposing and eliminating residual active oxygen species remaining in the rainwater that has been supplied to the storage tank.

5. A method for utilizing rainwater falling on a building, the method comprising:
   removing a predetermined quantity of initial precipitation from the rainwater collected from a roof surface of the building;
   supplying the rainwater to a purifier comprising a filtering tank containing a pH adjusting agent and a sterilization tank containing a primary reactive catalyst for producing active oxygen species, wherein the purifier carries out pH adjustment and sterilization;
   supplying the rainwater from the purifier to a storage tank; and
   monitoring a water level of the storage tank, and preventing the rainwater from entering the purifier and the storage tank if the water level has reached a predetermined upper limit.

6. The method of claim 5, further comprising carrying out physical filtration at or before an inlet port of the purifier.

7. The method of claim 5, wherein the pH adjustment neutralizes the rainwater that is acidic, and the sterilization is carried out using active oxygen species produced by decomposition of aqueous hydrogen peroxide.

8. The method of claim 5, further comprising decomposing and eliminating residual active oxygen species remaining in the rainwater that has been supplied to the storage tank.

9. A method for utilizing rainwater falling on a building, the method comprising:
   removing a predetermined quantity of initial precipitation from the rainwater collected from a roof surface of the building;
   supplying the rainwater to a purifier comprising a filtering tank containing a pH adjusting agent and a sterilization tank containing a primary reactive catalyst for producing active oxygen species, wherein the purifier carries out pH adjustment and sterilization;
   supplying the rainwater from the purifier to a storage tank; and
   monitoring a water level of the storage tank, and supplying tap water into the storage tank if the water level of the storage tank has reached a predetermined lower limit.

10. The method of claim 9, further comprising carrying out physical filtration at or before an inlet port of the purifier.

11. The method of claim 9, wherein the pH adjustment neutralizes the rainwater that is acidic, and the sterilization is carried out using active oxygen species produced by decomposition of aqueous hydrogen peroxide.

12. The method of claim 9, further comprising decomposing and eliminating residual active oxygen species remaining in the rainwater that has been supplied to the storage tank.

13. A method for utilizing rainwater falling on a building, the method comprising:
   removing a predetermined quantity of initial precipitation from the rainwater collected from a roof surface of the building;
   supplying the rainwater to a purifier comprising a filtering tank containing a pH adjusting agent and a sterilization tank containing a primary reactive catalyst for producing active oxygen species, wherein the purifier carries out pH adjustment and sterilization;
   supplying the rainwater from the purifier to a storage tank;
   monitoring a water level of the storage tank, and preventing the rainwater from entering the purifier and the storage tank if the water level of the storage tank has reached a predetermined upper limit;
   supplying tap water into the storage tank if the water level of the storage tank has reached a predetermined a predetermined lower limit; and
   pumping out the rainwater from the storage tank for various uses.

14. The method of claim 13, further comprising carrying out physical filtration at or before an inlet port of the purifier.

15. The method of claim 13, wherein the pH adjustment neutralizes the rainwater that is acidic, and the sterilization is carried out using active oxygen species produced by decomposition of aqueous hydrogen peroxide.

16. The method of claim 13, further comprising decomposing and eliminating residual active oxygen species remaining in the rainwater that has been supplied to the storage tank.

* * * * *

UNITED STATES PATENT AND TRADEMARK OFFICE
CERTIFICATE OF CORRECTION

PATENT NO. : 6,905,607 B2
DATED : June 14, 2005
INVENTOR(S) : M. Hosoya

It is certified that error appears in the above-identified patent and that said Letters Patent is hereby corrected as shown below:

Title page,
Item [57], ABSTRACT,
Line 5, "form" should be -- from --.

Column 12,
Line 32, delete "a predetermined" (first occurrence).

Signed and Sealed this

Thirty-first Day of January, 2006

JON W. DUDAS
*Director of the United States Patent and Trademark Office*